United States Patent
Nguyen et al.

(10) Patent No.: US 7,177,843 B2
(45) Date of Patent: *Feb. 13, 2007

(54) RIGHTS EXPRESSION SYSTEM

(75) Inventors: Mai Nguyen, Buena Park, CA (US); Joseph Zhung Yee Fung, Cerritos, CA (US); Duc Tran, Westminster, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 725 days.

This patent is subject to a terminal disclaimer.

(21) Appl. No.: 10/298,222

(22) Filed: Nov. 18, 2002

(65) Prior Publication Data

US 2003/0125976 A1 Jul. 3, 2003

Related U.S. Application Data

(63) Continuation-in-part of application No. 10/046,695, filed on Jan. 17, 2002.

(60) Provisional application No. 60/359,646, filed on Feb. 27, 2002, provisional application No. 60/331,619, filed on Nov. 20, 2001, provisional application No. 60/331,622, filed on Nov. 20, 2001, provisional application No. 60/261,753, filed on Jan. 17, 2001.

(51) Int. Cl.
*G06Q 99/00* (2006.01)
*H04K 1/00* (2006.01)
*H04L 9/00* (2006.01)

(52) U.S. Cl. .................. 705/51; 705/52; 705/53; 705/54; 705/55; 705/56; 705/57; 705/58; 705/59; 705/50; 380/201; 707/9; 707/104.1; 713/182; 713/184; 713/185; 713/186; 713/183

(58) Field of Classification Search ............ 705/50–59; 380/201; 707/9, 104.1; 713/182–186
See application file for complete search history.

(56) References Cited

U.S. PATENT DOCUMENTS 5,138,712 A * 8/1992 Corbin .................. 726/30

(Continued)

FOREIGN PATENT DOCUMENTS

EP 0 715 244 A1 6/1996

(Continued)

OTHER PUBLICATIONS

Perritt, Henry H. Knowbots, Permissions Headers, and Contract Law. Apr. 30, 1993. Retrieved from IDS.*

(Continued)

*Primary Examiner*—James A Reagan
(74) *Attorney, Agent, or Firm*—Marc S. Kaufman; Carlos R. Villamar; Nixon Peabody, LLP

(57) ABSTRACT

A rights expression system and method for facilitating creation and/or modification of rights expressions in a rights expression language based on one or more schemas are provided. In one embodiment, the rights expression system comprises selectable layouts corresponding to a rights granting paradigm and comprises type selection components. Each type selection component is adapted to present REL terms and input components. The input components allow input of parameters required by the selected REL term. The rights expression system also includes a data engine that generates rights expressions in proper REL semantics defined by the one or more schemas based on the selected layout and parameter inputted. The type selection components and input components may be type selectors and input forms, respectively, that are implemented in a graphical user interface.

42 Claims, 14 Drawing Sheets

U.S. PATENT DOCUMENTS

| | | | |
|---|---|---|---|
| 5,260,999 A * | 11/1993 | Wyman | 705/59 |
| 5,295,266 A * | 3/1994 | Hinsley et al. | 718/101 |
| 5,335,346 A * | 8/1994 | Fabbio | 711/163 |
| 5,499,298 A | 3/1996 | Narasimhalu et al. | |
| 5,532,920 A * | 7/1996 | Hartrick et al. | 715/500 |
| 5,629,980 A | 5/1997 | Stefik et al. | |
| 5,634,012 A | 5/1997 | Stefik et al. | |
| 5,638,443 A | 6/1997 | Stefik et al. | |
| 5,673,316 A | 9/1997 | Auerbach et al. | |
| 5,715,403 A | 2/1998 | Stefik et al. | |
| 5,798,757 A | 8/1998 | Smith | |
| 5,917,912 A | 6/1999 | Ginter et al. | |
| 6,169,976 B1 | 1/2001 | Colosso | |

FOREIGN PATENT DOCUMENTS

| | | | |
|---|---|---|---|
| JP | H03-282733 | * | 3/1990 |
| WO | WO 00/08909 | | 2/2000 |
| WO | WO 00/39733 | | 7/2000 |

OTHER PUBLICATIONS

International Search Report dated Feb. 13, 2004 for PCT/US03/05840.

CONTENTGUARD; "The Need for a Rights Language—Technical White Paper—Version 1.0"; Contentguard White Paper; 'Online!; Nov. 9, 2001; XP-002333474; pp. 1-12.

CONTENTGUARD; "XrML: Extensible Rights Markup Language—Version 1.2"; CONTENTGUARD XRML 1.2; 'Online!; Oct. 30, 2001; XP-002333475; pp. 1-134; http://www.xrml.org.

Renato Iannella; "Open Digital Rights Language (ODRL) Version: 09"; Online!; Jun. 29, 2001; XP-002333742; pp. 1-44.

David C. Fallside: "XML Schema Part O:; Primer"; W3C Recommendation; May 2, 2001; 'Online!; XP-002333743.

European Search Report for EP 02 80 3667; dated Aug. 31, 2005.

International Search Report dated Mar. 7, 2003 (PCT/US02/37087).

* cited by examiner

Figure 5
©2002 ContentGuard Holdings, Inc.

```
                                                                    35

<licenseGroup xmlns="http://www.xrml.org/schema/2001/11/xrml2core"
xmlns:sx="http://www.xrml.org/schema/2001/11/xrml2sx" xmlns:xsi="http://www.w3.org/2001/XMLSchema-
instance" xmlns:cx=" http://www.xrml.org/schema/2001/11/xrml2cx" " xmlns:secx="
http://www.xrml.org/exampleschema/secx" xsi:schemaLocation="
http://www.xrml.org/schema/2001/11/xrml2cx..\schema\xrml2cx.xsd
http://www.xrml.org/exampleschema/secx..\schema\secx.sxd">
 <license>
        <grant>
                <forAll varName="student">
                        <everyone>
                                <sx:dnsName>www.uscStudentGroup.com</sx:dnsName>
                        </everyone>
                </forAll>
                <principal varRef=" student"/>
                <possessProperty/>
                <secx:securityLevel>
                        <cx:value>5</cx:value>
                </secx:securityLevel>
        </grant>
        <issuer>
                <details>
                        <validityInterval>
                                <notBefore>2002-02-12T17:00:00</notBefore>
                                <notAfter>2003-02-12T17:00:00</notAfter>
                        </validityInterval>
                </details>
        </issuer>
</license>
```

Figure 13
©2002 ContentGuard Holdings, Inc

```
<?xml version="1.0" encoding="UTF-8"?>
<xsd:schema targetNamespace="http://www.xrml.org/schema/2001/11/Core"
xmlns:r="http://www.xrml.org/schema/2001/11/Core" xmlns:xsd="http://www.w3.org/2001/XMLSchema"
xmlns:enc="http://www.w3.org/2001/04/xmlenc#" xmlns:dsig="http://www.w3.org/2000/09/xmldsig#"
elementFormDefault="qualified" attributeFormDefault="unqualified">
    <xsd:import namespace="http://www.w3.org/XML/1998/namespace"
schemaLocation="http://www.w3.org/2001/xml.xsd"/>
    <xsd:import namespace="http://www.w3.org/2001/04/xmlenc#" schemaLocation="xenc-schema.xsd"/>
    <xsd:element name="licensePart" type="r:LicensePart"/>
    <xsd:element name="grant" type="r:Grant" substitutionGroup="r:resource"/>
    <xsd:element name="principal" type="r:Principal" substitutionGroup="r:resource"/>
    <xsd:element name="condition" type="r:Condition" abstract="false" substitutionGroup="r:licensePart"/>
    <xsd:element name="right" type="r:Right" abstract="false" substitutionGroup="r:licensePart"/>
    <xsd:element name="resource" type="r:Resource" abstract="false" substitutionGroup="r:licensePart"/>
    <xsd:simpleType name="LicensePartId">
        <xsd:restriction base="xsd:NCName"/>
    </xsd:simpleType>
    <xsd:complexType name="LicensePart" abstract="true">
        <xsd:attribute name="licensePartId" type="r:LicensePartId" use="optional"/>
        <xsd:attribute name="licensePartIdRef" type="r:LicensePartId" use="optional"/>
    </xsd:complexType>
    <xsd:complexType name="Grant">
        <xsd:complexContent>
            <xsd:extension base="r:Resource">
                <xsd:choice minOccurs="0">
                    <xsd:sequence>
                        <xsd:element ref="r:principal" minOccurs="0"/>
                        <xsd:element ref="r:right"/>
                        <xsd:element ref="r:resource" minOccurs="0"/>
                        <xsd:element ref="r:condition" minOccurs="0"/>
                    </xsd:sequence>
                </xsd:choice>
            </xsd:extension>
        </xsd:complexContent>
    </xsd:complexType>
    <xsd:complexType name="Principal">
        <xsd:complexContent>
            <xsd:extension base="r:Resource"/>
        </xsd:complexContent>
    </xsd:complexType>
    <xsd:complexType name="Right" abstract="false">
        <xsd:complexContent>
            <xsd:extension base="r:LicensePart"/>
        </xsd:complexContent>
    </xsd:complexType>
    <xsd:complexType name="Resource" abstract="false">
        <xsd:complexContent>
            <xsd:extension base="r:LicensePart"/>
        </xsd:complexContent>
    </xsd:complexType>
    <xsd:complexType name="Condition" abstract="false">
        <xsd:complexContent>
            <xsd:extension base="r:LicensePart"/>
        </xsd:complexContent>
    </xsd:complexType>
</xsd:schema>
```

RIGHTS EXPRESSION SYSTEM

This application claims priority from provisional patent applications Ser. No. 60/331,619 filed Nov. 20, 2001, Ser. No. 60/331,622 filed Nov. 20, 2001, and Ser. No. 60/359,646, filed Feb. 27, 2002, the contents of which are incorporated herein by reference. This application is a Continuation-in-part of co-pending application Ser. No. 10/046,695 filed on Jan. 17, 2002 which claims benefit from provisional application Ser. No. 60/261,753 filed on Jan. 17, 2001.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to rights expression systems for controlling use of digital works and other items. In particular, the present invention is directed to rights expression systems that facilitate creation and/or modification of rights expressions in a rights expression language based on one or more schemas.

2. Description of Related Art

Digital distribution of content by content owners over the Internet is a way to reach out to a potentially large market of Internet users. However, such digital distribution comes with a risk of illegal, or otherwise unauthorized, distribution of the content. Rights Management helps reduce this risk thereby enabling content owners to protect and profit from their digital content. A Rights Management System is utilized to specify the usage rights for content, or other things and to enforce the usage rights. The term "content" is used broadly herein and includes digital works such as music, audio files, text files, books, reports, video, multimedia, pictures, executable code, or any combination thereof.

Various implementations of Rights Management Systems and rights associated with digital content are known as disclosed by U.S. Pat. No. 5,629,980, U.S. Pat. No. 5,634,012, U.S. Pat. No. 5,638,443, and U.S. Pat. No. 5,715,403. Hence, the details of Rights Management Systems are not discussed specifically herein. As evident from these references, a Rights Management system can take many forms, and can employ varying levels of complexity depending on the security required, the nature of the thing being managed, the complexity of associated rights and conditions, volume and other factors. For example, Rights Management systems have been used to enable the secure distribution of digital media content over the Internet. Examples of such systems and associated paradigms are Pay-per-view, Subscription, and Superdistribution, as well as others. A Pay-per-view paradigm may require the user to pay a fee each time content is viewed. A Subscription paradigm may allow subscribers who pay monthly to download a number of songs per month. A Superdistribution paradigm may encourage the free and widespread distribution of digital content, such as audio or video clips, that can only be opened a limited number of times.

A Rights Management system not only protects content, but it also enables content owners to manage the sale and use of their content by means of licenses. Licenses include rights expressions to articulate usage rights and to associate usage rights to a content. Licenses may be specified for different stages during the life cycle of digital content. For example, when digital content is released to a distributor, licenses may be specified by content owners to limit distribution of the digital content to a particular region or a period of time, or to restrict how content may be repackaged. Of course, licenses themselves must be protected as well since they are a controlling facet determinative of how content is used. Typically, licenses are digitally signed by the issuers so that their integrity and authenticity may be verified before being interpreted. Before being signed, a license is known as an unsigned license.

Licenses may also stipulate terms and conditions applied to the rights offered by content owners. For example, a license to support a Subscription paradigm may require that the user pay $10.00 monthly to download up to 10 songs per month. A license to support a Pay-per-View paradigm may require the user to pay $5.00 to play a movie. A more dynamic license may specify approval from an online approval service before usage to the digital content is granted. Licenses must accommodate the flexible business rules that help generate sales for content and ensure that content owners are compensated rightfully for the use of their content.

A rights expression is a syntactically and semantically correct language construct, based on a defined grammar that conveys rights information. Licenses written in a Rights Expression Language (hereinafter "REL") can support multiple rights granting paradigms, ranging from simple to more complex, since the REL provides the syntactically and semantically correct construct and grammar for describing rights information. Rights information may include rights and conditions concerning the content. An example of a REL is XrML™ which allows a clearly defined way to structure, describe, and interchange rights data. Rights expressions written in XrML may be understood by different systems, enabling interoperability between these systems. Of course, XrML is merely one example of a REL and other RELs may also be used.

XML schema is an ongoing effort by the W3C to describe the structure of conforming XML documents, including provisions for defining data types. An XML schema may describe the structure and terms provided by a REL. For example, an instance of an XML schema, called "Core", may define a rights expression called "grant" to include four different types, namely, "principal", "right", "asset", and "condition". This expression stipulates that the indicated principal is granted the stated right over associated content under the given conditions.

The schema may also be extended to include new terms that are appropriate to a specific industry or rights granting paradigms. It is the extensibility of XML schema that empowers the REL to be adapted to any current, or new rights granting paradigms, and any industries. For example, a music company may seek to adopt the grammar specified by the XML schema using its own vocabulary. The music company creates an extension of this schema, called "S1", defining a new principal called "subscriber", a new right called "play", a new asset called "music content X0", and a new condition called "online". The music company may then create expressions such as "any subscriber can play music content X0 online".

A second music company who allows downloads may define yet another extension, called "S2", to include a right called "download" for building expressions such as "any subscriber can download music content X0", assuming the grammar defines the condition to be optional. Note that S1 extends the original schema Core, enabling it to use any definitions provided by Core. Also, since S2 extends S1, S2 may use definitions provided by both S1 and Core. The above exemplary Core schema is described using XML Schema syntax in FIG. 13. As can be appreciated, the Core schema basically defines a grant that includes four different types: principal, right, resource and condition in the present example.

SUMMARY OF THE INVENTION

In accordance with one aspect of the present invention, a rights expression system for facilitating creation and/or modification of rights expressions in a rights expression language (REL) based on one or more schemas is provided. In one embodiment, the rights expression system comprises one or more selectable layouts, each layout corresponding to a rights granting paradigm. Each layout comprises one or more type selection components, each type selection component being adapted to present one or more REL terms, and one or more input components associated with the one or more REL terms which are invoked based on a selected REL term, the one or more input components allowing input of a parameter required by the selected REL term. The rights expression system also includes a data engine that generates rights expressions in proper REL semantics defined by the one or more schemas based on the selected layout and parameter inputted. In accordance with another embodiment of the present invention, the type selection components and input components may be type selectors and input forms, respectively, that are implemented in a graphical user interface.

In accordance with another aspect of the present invention, a method for creating and/or modifying rights expressions in a rights expression language (REL) based on one or more schemas is provided. In one embodiment, the method comprises the steps of providing one or more layouts, each layout corresponding to a rights granting paradigm, selecting at least one of the one or more of layouts, providing one or more type selection components associated with the selected layout, selecting at least one of the one or more type selection components, providing one or more REL terms associated with the selected type selection components, selecting at least one of the one or more of REL terms, providing at least one input component associated with the selected REL term, inputting parameters required by the input component, and generating a rights expression in proper REL semantics defined by the one or more schemas based on the selected layout and parameters inputted. In accordance with another embodiment of the present invention, the type selection components and input components may be type selectors and input forms, respectively, that are implemented in a graphical user interface.

BRIEF DESCRIPTION OF THE DRAWINGS

FIG. 5 shows an example rights template generated by the certificate layout of FIG. 3.

FIG. 13 is an example schema upon which the rights expression language may be based.

DETAILED DESCRIPTION OF THE INVENTION

Rights Management systems can be applied to digital content and other items, such as services, goods, and the like. For example, rights and conditions can be associated with any physical or non-physical thing, item, object, class, category, service, or other items for which access, distribution, execution, or other use is to be controlled, restricted, recorded, metered, charged, monitored or otherwise managed in some fashion. Thus, a Rights Management system can be used, for example, to specify and enforce usage rights for any item such as content, service, software program, goods etc., and under what conditions. In this regard, to extend the concept of rights management to tangible items, an item ticket can be used to associate usage rights with the item. A license or other rights expression is associated with the item ticket 200, illustrated in FIG. 14, with a ticket specification that points to or otherwise indicates the item ticket.

The item ticket 200 can be protected with some crypto algorithm or other mechanism for preventing processing or rendering of item ticket 200 except in accordance with an associated, license. The item ticket 200, with the security mechanism unlocked, can be a human readable or computer readable coupon, a code, a document, or the like. Accordingly, the phrase "item ticket" refers to any tangible or intangible indication of an item. The item ticket specifies one or more items and thus, usage rights and conditions can be associated with any item including, objects, classes, categories, and services, for which use, access, distribution, or execution is to be controlled, restricted, recorded, metered, charged, or monitored in some fashion as previously noted.

Figure 14:
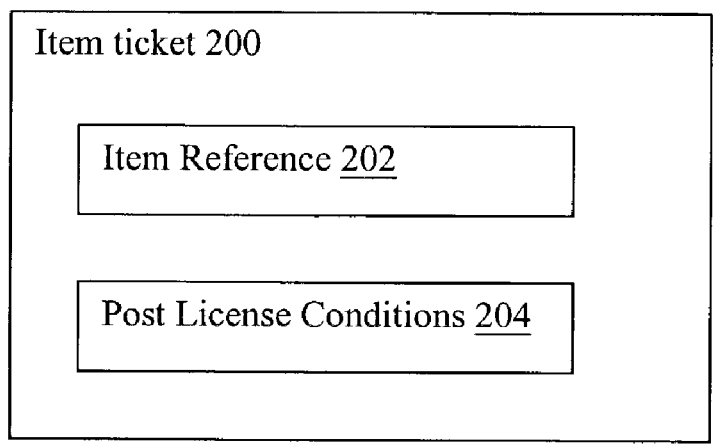
FIG. 14 is a schematic illustration of an item ticket that may be used in implementation of the present invention.

As illustrated in the preferred embodiment of FIG. 14, the item ticket 200 can be prepared by specifying an item reference 202 and any post license conditions 204 that restrict redemption of the item ticket 200. The item ticket 200 can be linked to the item through the item reference 202.

The term "linked" as used herein refers to any type of association, such as a description, a pointer, or the like. For example, the item ticket 200 can include a unique code associated with an item through a database record. When the code is presented to a vendor, the database is searched and the corresponding item can be delivered. Item ticket 200 can also include a human readable description of the item and any post license condition 204 not yet satisfied such as certain location or time the item ticket 200 may be redeemed. Further details of Rights Management systems utilizing item tickets are disclosed in U.S. application Ser. No. 10/159,272 entitled METHOD AND APPARATUS FOR DISTRIBUTING ENFORCEABLE PROPERTY RIGHTS that was filed on Jun. 3, 2002, the contents of which are incorporated herein by reference.

Regardless of the details of the item, and whether the item is digital content, object, class, category, service, or other items, the task of writing valid licenses to correctly reflect one or more rights granting paradigms is difficult, especially for complex rights granting paradigms. The underlying Rights Management related technologies, such as the REL must be fully understood in order to write valid licenses. For example, when the REL is XrML™, the XML Schema and in particular, the syntax and semantics of XML terms must be understood by the interoperability and the Schema extensibility. Thus, such RELs are advantageous in that they may be extended to support new rights granting paradigms. The extensibility requires further knowledge and skill of the user to write valid licenses.

There have been efforts to create generic editors that use form-based data input and graphical elements to facilitate the user in editing XML documents. Such editors assist the user with the syntax of the schema being used, but the user is still burdened with comprehending the semantics of rights expressions. An output from these editors ensure an XML document that is syntactically correct. However, the propriety of the semantics of the REL is not ensured. Any misapplication of the REL in a rights expression of a license could potentially result in misuse of item and/or in revenue loss.

In view of the above, a rights expression system is desirable which provides features and capability beyond generic XML editors. In particular, a rights expression system that provides guidance on the semantics of a REL and its extensions is desirable for allowing the item owner, the rights holder, or another authorized party, to create and modify licenses more easily and accurately. This may be attained in accordance with the present invention by providing a rights expression system, an embodiment of which is described herein, for facilitating creation and/or modification of rights expressions in a REL that is based on one or more schemas.

Figure 1:
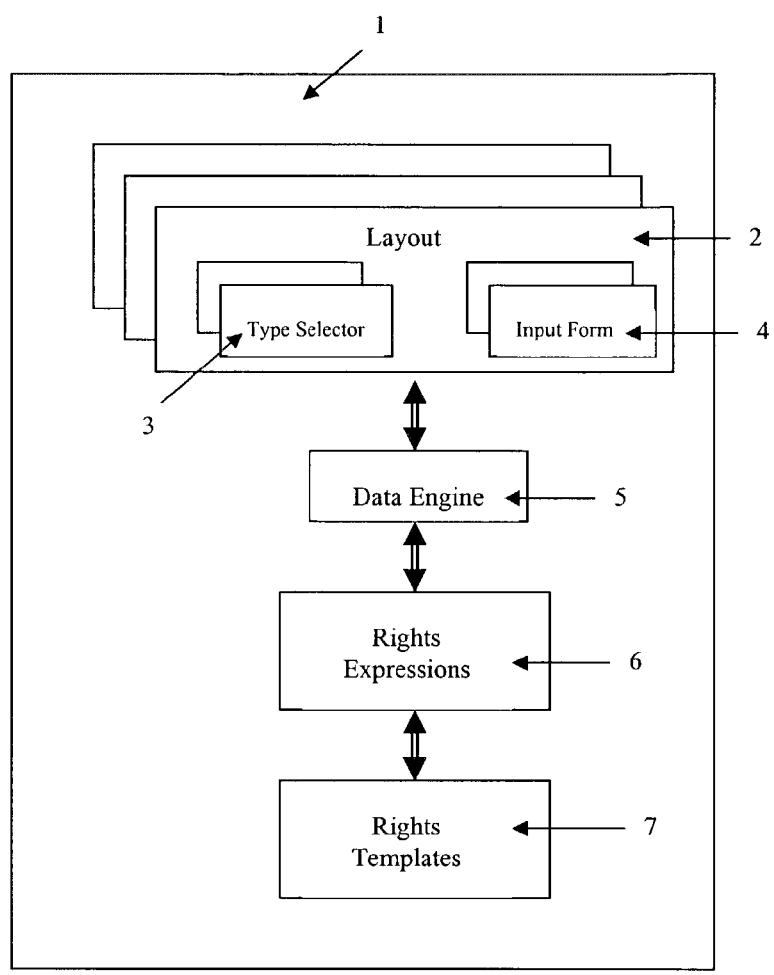
FIG. 1 is a block diagram of the rights expression system in accordance with one embodiment of the present invention.

FIG. 1 is a schematic diagram of the rights expression system 1 in accordance with one embodiment of the present invention which may be used for facilitating creation and/or modification of rights expressions in a REL based on one or more schemas. In the illustrated embodiment, the rights expression system 1 includes plural layouts 2, each layout corresponding to a rights granting paradigm. Preferably, each layout 2 is constructed specifically for a rights granting paradigm to allow users to simply input information associated and/or required for the rights granting paradigm as described below. Each of the collection of layouts 2 have associated syntax and semantics of the rights expression grammar so that the user of the rights expression system 1 does not have to know such grammar and the desired rights expression can be created and/or modified easily.

In other words, since each of the collection of layouts 2 is constructed to properly represent the rights granting paradigm, each layout 2 requires the user to enter only certain specific information required by the rights granting paradigm. The rest of the detailed rights expression grammar necessary to generate a meaningful and valid license are generated automatically by the rights expression system 1. This ensures that the generated rights expression is valid with respect to the selected rights granting paradigm. Thus, each of the layouts in the collection of layouts 2 serves as a starting point for generating rights expressions in proper REL semantics, focusing the user on the desired rights granting paradigm and guiding the user through the rights expression creation and/or modification process.

Each layout 2 preferably includes plural type selection components such as type selectors 3. Preferably, each type selector 3 is adapted to present one or more REL terms that can be selected by the user. In addition, in the illustrated embodiment, each of the layouts 2 also includes plural input components such as input forms 4 that are associated with the one or more REL terms. The input forms 4 are invoked corresponding to a REL term that is selected by the user, the input forms 4 allowing input of a parameter required by the selected REL term. In accordance with one embodiment, the type selector 3 and the input forms 4 of the rights expression system 1 are implemented with a graphical user interface (hereinafter "GUI") to facilitate input of the parameters. Examples of such GUI implementations of the type selector 3 and the input forms 4 are shown in FIGS. 3, 4, 6 and 7 discussed below.

The rights expression system 1 of FIG. 1 also includes a data engine 5 that generates rights expressions 6. The rights expressions 6 are generated in proper REL semantics defined by the schemas of the REL based on the selected layout 2, the type selectors 3 used, and the parameters inputted into the input forms 4. For example, FIG. 5 illustrates a REL rights expression 35 that is generated by the rights expression system 1 which is in proper REL semantics, and in this case, is expressed based on the XrML™ schema.

The rights expressions 6 generated is also used by the data engine 5 to generate rights templates 7. This allows generation of rights templates that correspond to common rights expressions that may be used in one or more layouts 2. The generated rights templates 7 can then be stored in a database or the like so that they can be retrieved and modified by the user of the rights expression system 1 to quickly and easily create valid licenses or other rights expressions. The generated templates 7 thus allows the user to simply modify a small portion of the rights expression, such as the principal for example, to generate the proper license rather than having to create new rights expressions from the beginning for use in a license. Of course, rights template may also be used in an automatic process to create licenses. For example, a rights template for creating a certificate may have been created for a subscription paradigm. When a user pays an appropriate fee, a subscription service retrieves the rights template for creating a certificate and fills it with the user's identity to produce a completed certificate. Thus, in this example, the work of producing rights expressions for use in a license is attained using a command line interface or an Application Programming Interface (herein after "API") instead of a GUI.

Figure 2:
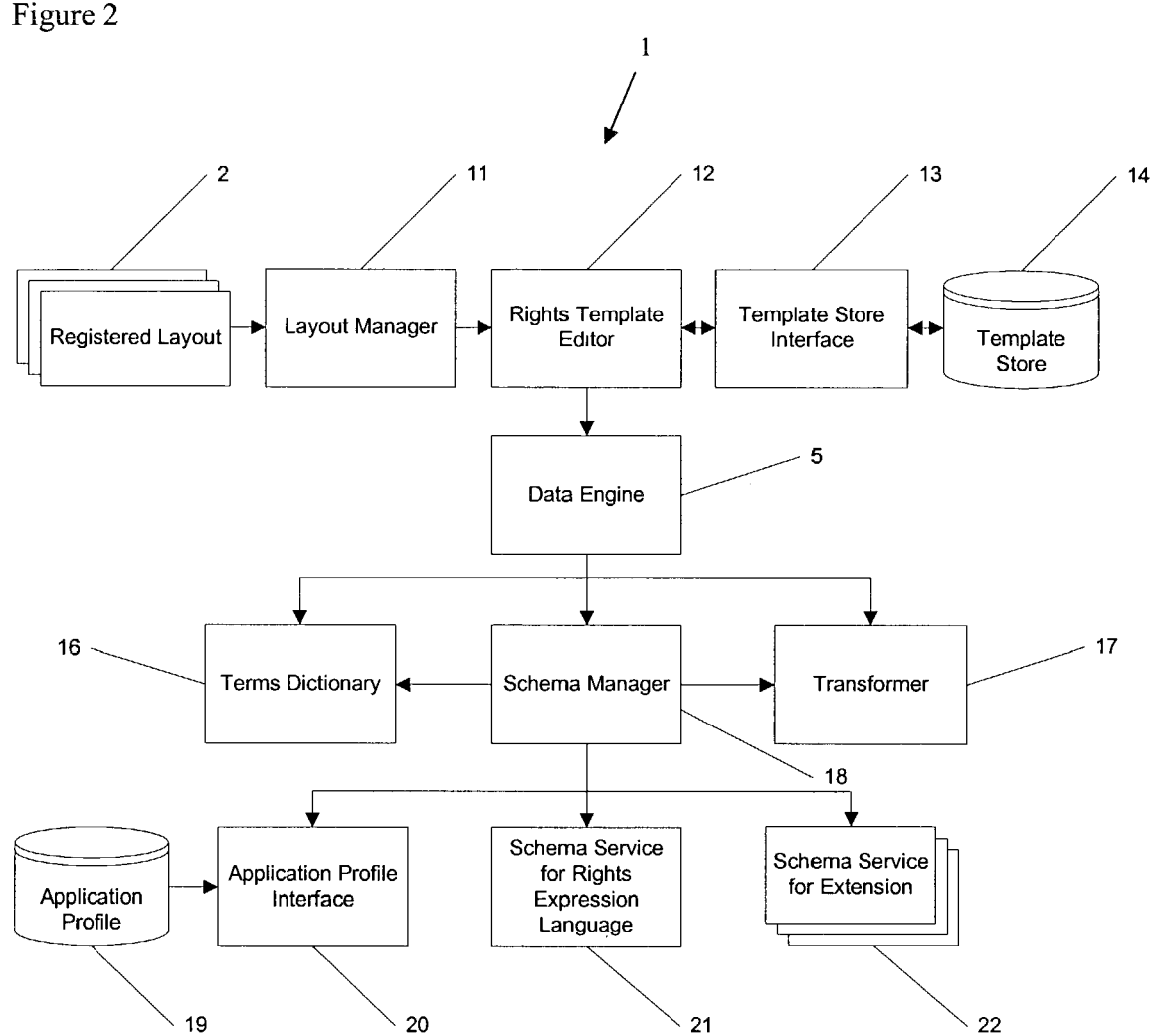
FIG. 2 is a schematic diagram of an implementation of the rights expression system of FIG. 1 in accordance with one embodiment of the present invention.

FIG. 2 is a block diagram of the rights expression system 1 of FIG. 1 in accordance with one embodiment of the present invention which enables the creation and/or modification of rights expression of an REL based on one or more schemas, both FIGS. 1 and 2 being referred to herein for clarity. As previously noted, the rights expression system 1 includes a collection of layouts 2 for the most commonly used rights granting paradigms. The collection of layouts 2 may be located in layout storage device such as a local hard drive (not shown) or the like which is managed by the layout manager 11. In this regard, each of the layouts may be registered with the layout manager 11 so that the desired layout can be readily retrieved and used in the manner intended.

In addition, the layout manager 11 of the present embodiment is also adapted to facilitate the addition of new layouts that are customized for a particular rights granting paradigm. This allows the rights expression system 1 of the present invention to be extensible to accommodate new rights granting paradigms and further allows the user to quickly adapt to business needs. Preferably, the addition of layouts is attained by the layout manger 11 so that new layouts can be added to the rights expression system 1 without recompiling the rights expression system 1.

The rights expression system 1 also includes a rights template editor 12 that allows editing of the rights templates 7 by the user as previously described, the rights templates 7 being generated based on rights expressions 6. When the user selects a layout 2 via the layout manager 11 based on the desired rights granting paradigm, the rights template editor 12 brings up the rights expressions 6 contained in the selected layout 2. Correspondingly, the rights template editor 12 allows the user of the rights expression system 1 to select each editable part of the rights expressions 6 to modify it and produce a rights template. Hence, new rights templates may be created by selecting a layout and the created rights templates may be later modified using the rights template editor 12.

For a rights expression 6 or a part thereof that is extensible, a respective button or link may be provided on the selected layout 2 which invokes one or more type selection components such as the type selector 3. The type selector 3 allows the user to select the type of the rights expression, for instance, Principal, Right, Resource and Condition. In this regard, each type selection component is preferably adapted to present one or more REL terms that are associated with the selected type. For example, if the Right type is selected, REL terms corresponding to the Right type such as "view", "print", "distribute", etc. are presented. Upon the selection of one of the presented REL terms, one or more input components such as the input forms 4 associated with the selected REL terms are invoked to allow input of parameters that are required by the selected REL term. In the embodiment where the rights expression system 1 is implemented in a GUI, both the user's input and their textual descriptions may be returned to the selected layout for display.

When the user of the rights expression system 1 completes inputting of data using the input forms 4, a rights template 7 containing rights expressions 6 written in the REL and its extensions is generated. Preferably, implanted in the first line of the rights template 7 is the identification of the layout 2 which facilitates later retrieval and modification of the rights template 7. Once a rights template 7 has been generated, it is stored to template store 14 which may be a database. The template store interface 13 may be used to retrieve the stored template 7 that was generated so that the rights template editor 12 can be used to modify the template 7. Additionally, the template store interface 13 may also be used to facilitate replacing the template store 14 with another template store service (not shown), if provided, that may be more appropriate for a particular application of the rights expression system 1.

The rights template editor 12 interfaces with data engine 5 which provides an open API to the rights expression system 1 thereby allowing users to access, modify, and create rights templates 7 as described above. In addition, the data engine 5 is connected to a terms dictionary 16, a transformer 17, and a schema manager 18, the functions of which are described in further detail below.

Supporting the function of the type selector 3 and the rights expression 6 generation feature of the rights expression system 1 is a terms dictionary 16 that is built by the schema manager 18. The terms dictionary 16 lists the REL terms and information relating thereto so that proper REL terms may be presented when the desired type is selected using the type selector 3 and a rights expression that is in proper semantics may be generated. The terms dictionary 16 may be embodied as a table containing all core terms that make up the core structure of the REL, and terms derived from the core terms. For example, the terms dictionary 16 may contain the following table:

TABLE 1

| REL Term | Type | Stylesheet | Prefix | Namespace |
| --- | --- | --- | --- | --- |
| View | Right | cx.xsl | Cx | cxNamespace |
| Print | Right | cx.xsl | Cx | cxNamespace |
| keyHolder | Principal | core.xsl | Core | coreNamespace |
| validityInterval | Condition | core.xsl | Core | coreNamespace |
| Fee | Condition | Sx.xsl | Sx | sxNamespace |

As shown in TABLE 1, the REL terms are listed along with their respective type, stylesheet, prefix, and namespace. In the above example of the terms dictionary 16 as shown in TABLE 1, the core terms are listed under the "Term" heading. A term type indicates the term category, e.g., whether it's a "right", a "principal", or a "condition". Thus, as previously noted, if the "right" type is selected, REL terms corresponding to the Right type such as "view", "print" are presented to the user by the rights expression system 1. For example, a "condition" selection would query the terms dictionary for all available conditions for the user's selection. Of course, the extensible core types are not limited to these types, but instead, may include other types such as issuer type.

By selecting one of the REL terms, one or more input forms 4 associated with the selected REL term is presented to the user so that specific parameters required by the selected REL term can be inputted or otherwise modified. Upon input of such required parameters, the type selection components such as the type selectors 3, use the information in TABLE 1 such as the stylesheet, prefix, and namespace to generate a rights expression that is in proper REL semantics so that the user does not need to go look up the specific schemas of the REL. For example, when the user selects "fee", information under the "Prefix" heading and "Namespace" heading together allows the data engine 5 to invoke the schema service for extension 22, in particular, the schema service for the sxNameSpace, to generate the rights expression in proper REL semantics. Thus, in the present example, the information under the "Stylesheet" heading, i.e. "Sx.xsl", is used by the selector to translate the created rights expression to its textual description. Therefore, it should now be evident that the task of the type selection component such as the type selector 3 is to bridge between the textual descriptions of a rights expression and the correct input components such as input forms 4 that are used to input technical parameters required by the rights expression.

Referring again to FIG. 2, the schema manager 18 builds the term dictionary 16 and the transformer 17 based on the schema services 21 and 22, and application profile 19 currently existing in the rights expression system 1 that is accessed through the application profile interface 20. In accordance with one embodiment of the rights expression system 1, the schema service for REL 21 defines terms and their metadata in the REL while the schema service for extension 22 defines terms and their metadata for extensions of the REL. The REL terms are kept in the terms dictionary 16, and each new REL extension is handled by schema service for extension 22 that is built for the corresponding new REL extension. Each schema service for extension 22 is responsible for providing the REL terms defined in its corresponding REL extension to the terms dictionary 16. Each schema services 21 and 22 is also responsible for providing the REL terms of its corresponding REL extension to the input components so that the user can select the desired term in generating the desired rights expression. In this regard, the schema services 21 and 22 function as parsers that parse through the REL for a specific extension to expose the REL's vocabulary.

The application profile 19 may be used to limit the vocabulary provided by one or more schemas of the REL so that only selected REL terms are visible to the user. In particular, the application profile 19 may be processed by the application profile interface 20 to restrict terms defined by the schema services 21 and 22 so that only a subset will be available to the term dictionary 16 and the transformer 17 of the rights expression system 1. The application profile 19 of the rights expression system 1 in the present embodiment is expressed using the REL schema such as XrML™ schema. The application profile 19 may draw and refine terms from the REL and/or any of its extension, and may specify permitted schemes and values for these terms. In accordance with one embodiment, the application profile 19 is configured to use the name of the profiled application as its root element. It should be understood that preferably, the application profile 19 is used merely to convey what terms should go into the terms dictionary 16 for the current deployment. Thus, whereas license validation is performed against the REL and the respective extensions, such license validation is not performed against the application profile in the illustrated embodiment.

In addition, in accordance with one embodiment of the rights expression system 1, the transformer 17 is invoked to convert the generated rights expressions into their textual description for display in the layout which serves as a neutral space for the display of the rights expressions to facilitate user's comprehension of the rights expression. Furthermore, in accordance with one embodiment of the present invention, the layouts 2 are preferably capable of embedding terms from new REL extensions so long as a schema service 22 associated with the new REL extension is provided. This capability is made possible because type selection components such as one or more type selectors 3 for each extensible core type will recognize any terms defined for their type. For example, to support a new REL extension that defines an REL term called PassportUser, a schema service 22 may be added to the rights expression system 1 that is responsible for telling the terms dictionary 16 that it has the PassportUser term of the type "Principal". When the type selection component of the type "Principal" is invoked, it will show PassportUser as one of the selections available to the user.

Thus, it should be evident from the above discussion that the rights expression system 1 of the present invention is context aware in that each layout 2 focuses on a particular rights granting paradigm and is structured based on core structure of the REL thereby allowing terms defined in extensions of the REL to be added. Furthermore, the rights expression system 1 allows new layouts for new and innovative rights granting paradigms to be used by registering the new layout with the layout manager 11. In addition, the rights expression system 1 allows core aspects to be extended to handle new extensions of the REL by using new schema services for extension 22 that can be provided to the schema manager 18. Moreover, the rights expression system 1 also allows the layouts 2 to be used in displaying the generated rights expressions by their textual descriptions.

In accordance with the preferred implementation of the present invention, the rights expression system 1 is implemented with a GUI to provide a user friendly system that facilitates creation and/or modification of rights expressions in proper REL semantics. Of course, in other embodiments, other user interfaces may be used instead such as a programmable interface or a command line interface. However, the implementation using a GUI is very advantageous in that it is easy to use/navigate and further allows semantics transparency by providing various interactive forms such as the type selectors 3 and input forms 4 described above that are built specifically for an REL and its extensions, serving as guidance on the semantics. These interactive forms are user-friendly because they incorporate knowledge of the language and rights granting paradigms as previously described. As described below, one embodiment of the rights expression system 1, the layout 2, type selectors 3, and input forms 4 are implemented with a GUI. In addition, the GUI implementation of the rights expression system 1 allows the layouts 2 to be neutral and agnostic to the underlying extensions to the REL.

Figure 3:
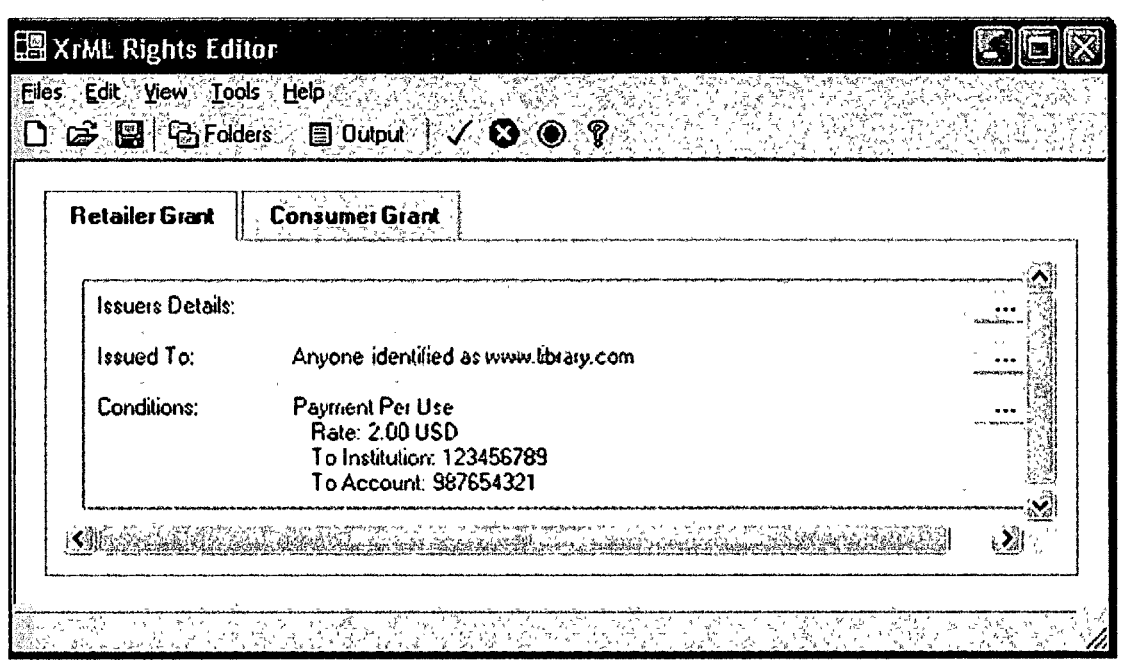
FIG. 3 is an example distribution layout in accordance with one embodiment implemented in a GUI.

FIG. 3 shows an example GUI that is representative of a distribution layout 30 which may be one of the collection of layouts 2 of the rights expression system 1. As shown, the distribution layout 30 is implemented as a graphical window of an XrML™ Rights Editor and displays a textual description of the respective rights templates associated with the layout,. displays the current parameters of the distribution rights granting paradigm, and facilitates input and selection of the parameters required for the distribution rights granting paradigm. In particular, the distribution layout 30 as shown in FIG. 3 allows distribution to anyone identified as www.library.com upon satisfaction of the conditions set forth including payment of $2.00 per use to institution "123456789" to account number "987654321".

When the user chooses to modify a portion of a rights expression set forth in the distribution layout 30, for example, the condition, the user can click its corresponding ". . ." button to initiate the modification process. In particular, the present embodiment of the rights expression system 1 allows the user to select from a list of available choices for each of the parameters required by the distribution layout 30 by clicking on the ". . ." buttons located in the, rightmost column. Such a process is described in further detail relative to FIGS. 8 and 9. At the end of process 70 of FIG. 9, the textual description of the newly added conditions will be displayed on the distribution layout 30. Of course, the other parts of the distribution layout 30 may be modified as well including the information regarding the issuer and the principal who is the person the grant is issued to, both of which are displayed on the distribution layout 30. In addition, in other embodiments, alternative selection mechanisms may be used instead of buttons and the like such as drop down menus, etc.

Figure 4:
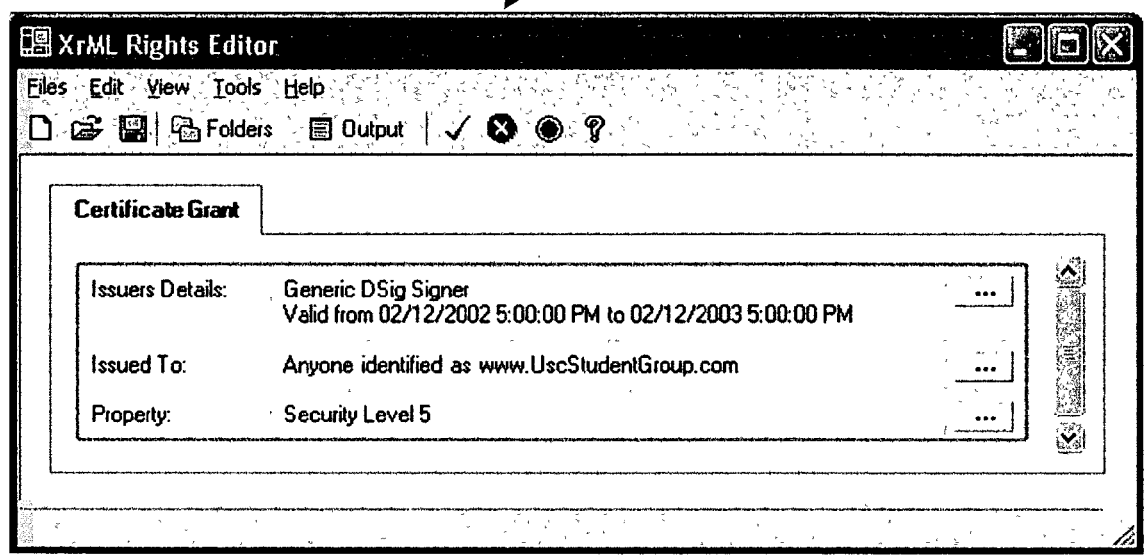
FIG. 4 is an example certificate layout in accordance with one embodiment implemented in a GUI.

FIG. 4 shows an example certificate layout 33 implemented via GUI that may be one of the collection of layouts 2 of the rights expression system 1. The certificate layout 33 is also implemented as a window of an XrML™ Rights Editor that may be used to generate a license representing a digital certificate and to facilitate input and selection of information required to generate the digital certificate. In particular, the certificate layout 33 displays the parameters of the digital certificate to be generated, and allows the user to enter or edit the parameters regarding the issuer(s), the principal to receive the certificate, and the certified property.

The output of the certificate layout 33 of FIG. 4 is illustrated in the REL rights expression 35 of FIG. 5. As can be appreciated by one of ordinary skill in the art, the rights expression 35 that is generated by the rights expression system 1 of the present embodiment is in proper REL semantics, which in this case, is expressed based on the XrML™ schema. In the present example, the rights expression 35 of FIG. 5 is a license to certify that anyone from www.UscStudentGroup.com is granted a security level of 5.

Without the layouts 2 and various features of the rights expression system 1 of the present embodiment, the rights expression 35 would conventionally be generated manually by the user. As previously noted, to generate the rights expression 35 in a conventionally manner, the user must have intimate knowledge and expertise in the syntax and semantics of the REL, in this case, XrML™. However, by using the rights expression system 1 in accordance with the preferred embodiment of the present invention, the rights expression 35 can be easily generated using the certificate layout 33 by providing various parameters required by the layout. Therefore, the user of the rights expression system 1 does not need to have intimate knowledge or expertise in the syntax and semantics of the REL being used. Of course, the certificate layout 33 is merely one example layout from the collection of layouts 2 in the rights expression system 1, the other layouts allowing the generation of different rights expressions which are also in proper REL semantics defined by the schemas of the REL.

Referring again to the certificate layout 33 of FIG. 4, the rights expression system 1 also allows the user to select the parameters of the certificate from a list of available choices by clicking on the ". . . " buttons located in the rightmost column of the certificate layout 33. For example, when the user of the certificate layout 33 clicks on a ". . . " button corresponding to the "Issued To" field, the rights expression system 1 recognizes that the user would like to select a new principal and brings up an appropriate type selectors of the layout such as the Principal selector 36 shown in FIG. 6 discussed below. Of course, other associated type selectors are provided for the other parameters of the certificate layout 33 such as the Issuers Details and Property. Moreover, other layouts of the collection of layouts 2 in the rights expression system 1 may also be provided with respective associated type selectors as well.

Figure 6:
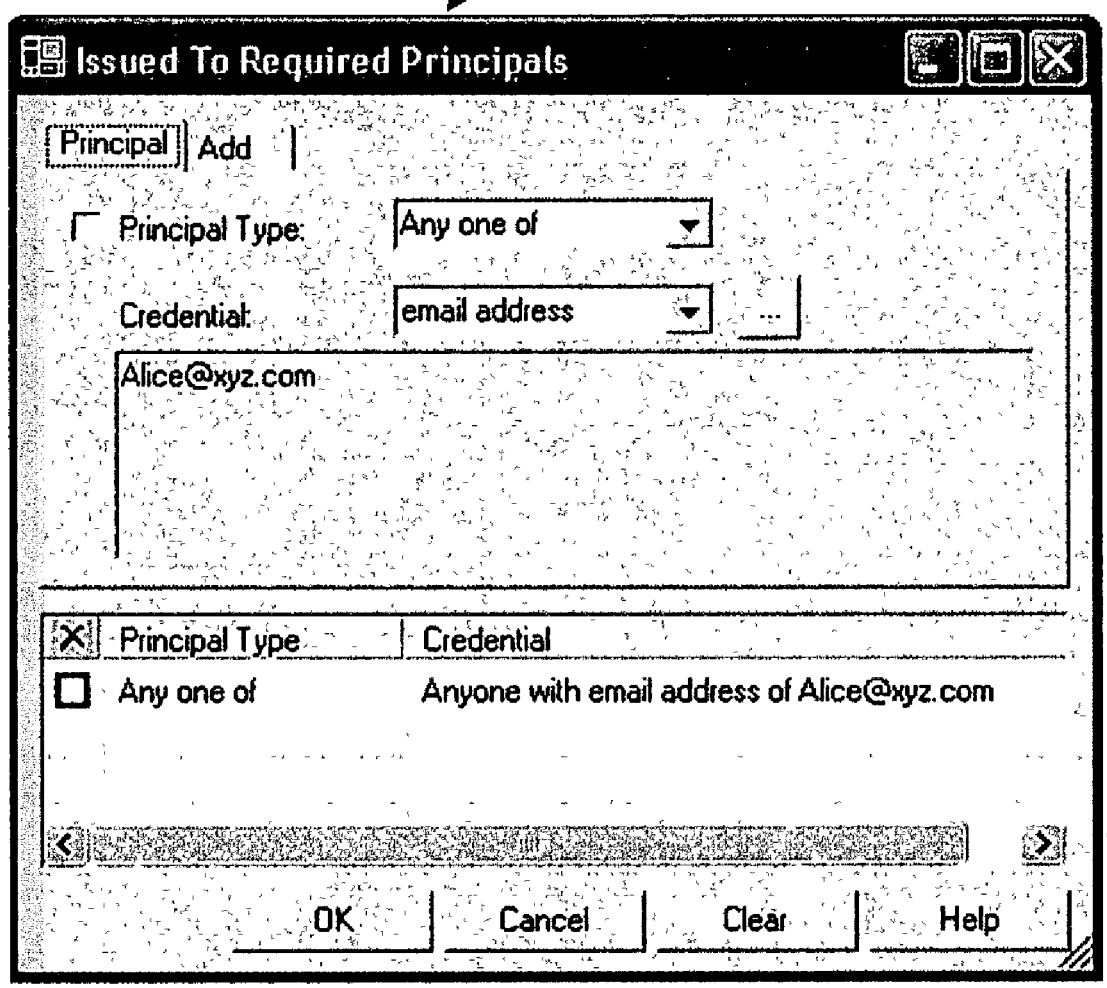
FIG. 6 shows an example type selector in accordance with one embodiment implemented in a GUI.

The Principal selector 36 shown in FIG. 6 is one of the example type selector that may be provided by the rights expression system 1 to gather valid options available to the user, and present them to the user in a user friendly manner, in the present example, via a GUI. Thus, the principal type may be selected from the Principal selector 36 by using the dropdown list labeled "Principal Type". The dropdown list labeled "Credential" lists information used to authenticate the selected principal type, for example, an e-mail address.

In the illustrated example, the Principal Type is selected to the REL term "Any one of" while the credential is selected to "email address" thereby allowing the generation of a rights expression that issues the license to "Anyone with email address of Alice@xyz.com" as shown in the display area of the Principal selector 36. Of course, other REL terms may be provided in the principal types dropdown list such as "All of", "Only", etc. which can be selected by the user to ensure that the license is granted to the desired principal(s). In addition, other credentials such as "name", "residential address", "digital certificate", etc. may be selected by the user as well.

Figure 7:
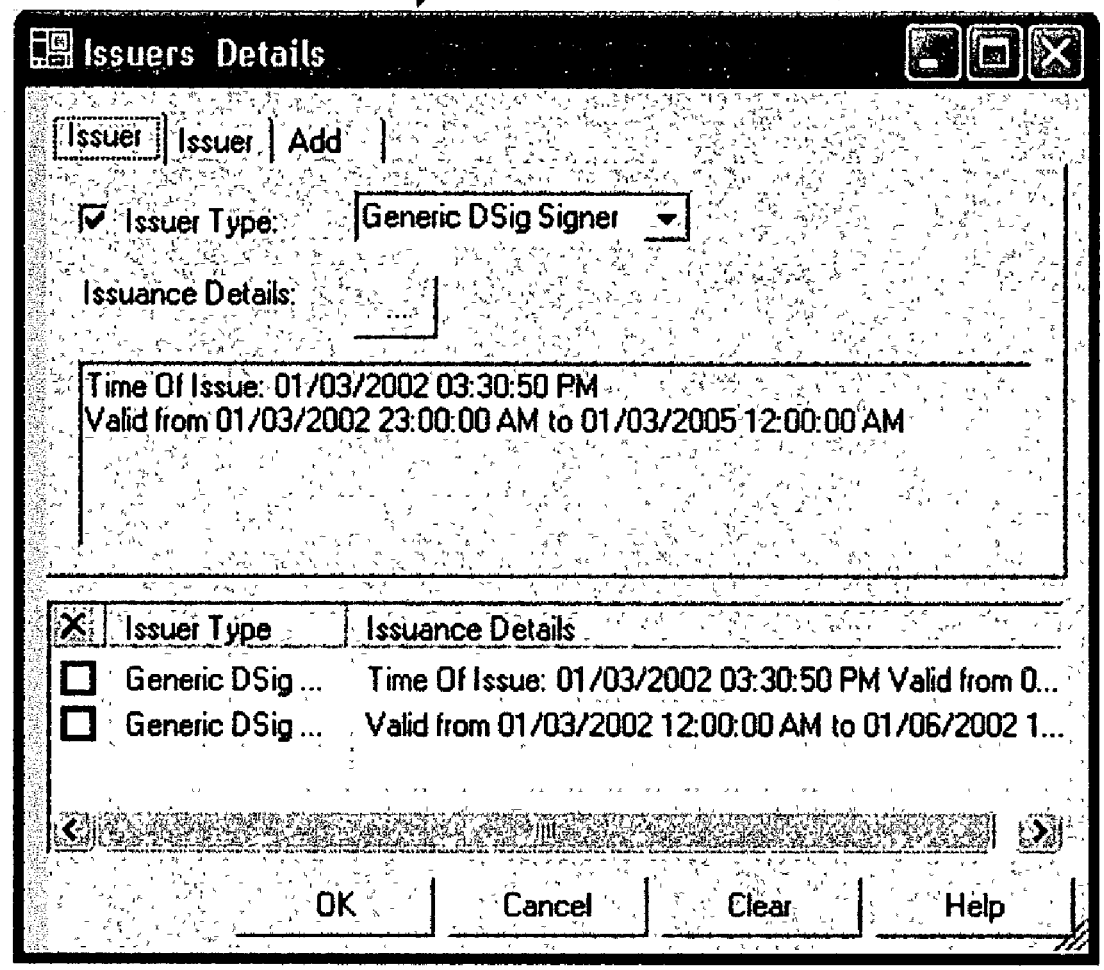
FIG. 7 shows an example input form in accordance with one embodiment implemented in a GUI.

FIG. 7 shows an input component implemented as input form 38 that may be provided by the rights expression system 1 to allow the user to input the parameters required by the selected REL term. In the present embodiment, the input form 38 is used to gather information about one or more issuers of the rights expressions, and is implemented in a graphical window via a GUI to facilitate input by the user. In particular, the REL term "Generic DSig Signer" is selected in the corresponding issuer type which causes the presentation of the input form 38 with selectable options provided on the bottom window. The issuance details are set forth so that the user can select the desired parameters such as the time of issue and/or validity duration as shown. Of course, the input form 38 shown in FIG. 7 is merely one example and a collection of input forms may be provided by the rights expression system 1 which are associated with the selected REL term to thereby facilitate input and collection of information required by the layout of the rights granting paradigm.

Thus, from the above description, it should be evident that layouts of the collection of layouts 2 each utilize one or more type selectors, each type selector presenting choices of REL terms derived from a specific extensible core element. The core element may be a principal receiving the rights, a condition, etc., based on the parameters required by the layout being used. Depending on the user's selection, the type selector such as the Principal selector 36 will bring up one or more input components such as an input form 38 for the user to fill out so as to provide the required parameters associated with the REL term. This input form may be part of the rights expression system 1 of the present invention, or it may be added to the rights expression system by extensibility mechanisms.

Figure 8:
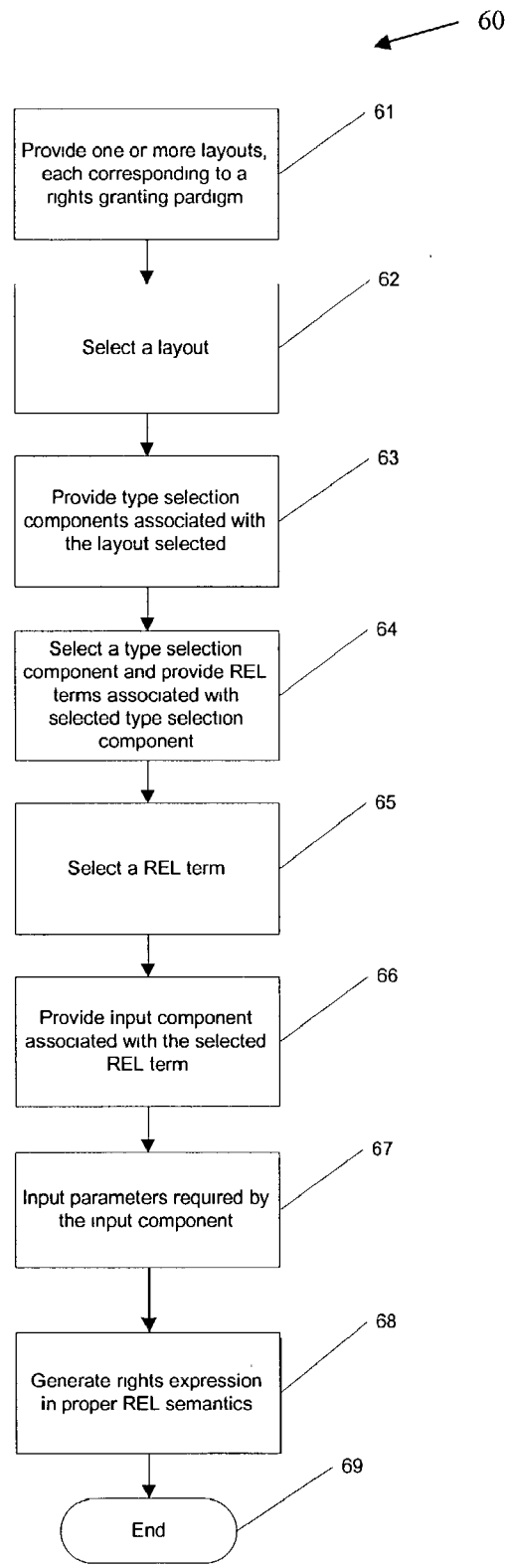
FIG. 8 is a flowchart of an example process for facilitating creation and/or modification of rights expressions in accordance with one embodiment of the present invention.

It should also be evident from the above discussion that another aspect of the present invention is in providing a method for facilitating creation and/or modification of rights expressions. FIG. 8 shows flowchart 60 that sets forth an example method in accordance with one embodiment. The method includes step 61 of providing one or more layouts, each layout corresponding to a rights granting paradigm, and step 62 in which at least one of the layouts is selected. In step 63, one or more type selection components associated with the selected layout is provided. At least one of the type selection components is selected in step 64 which results in providing of one or more REL terms associated with the selected type selection components. At least one of the REL terms are selected in step 65, and at least one input component associated with the selected REL term is provided in step 66. In step 67, the parameters required by the input components are inputted, and a rights expression is generated in step 68 in proper REL semantics defined by the one or more schemas based on the selected layout and parameters inputted. The process ends at step 69. Of course, it should also be evident that the generated rights expression of step 68 may be used to generate a rights template in other embodiments. Moreover, rights templates may be generated for other rights expressions and may be stored for future retrieval and use in the manner previously described.

Figure 9:
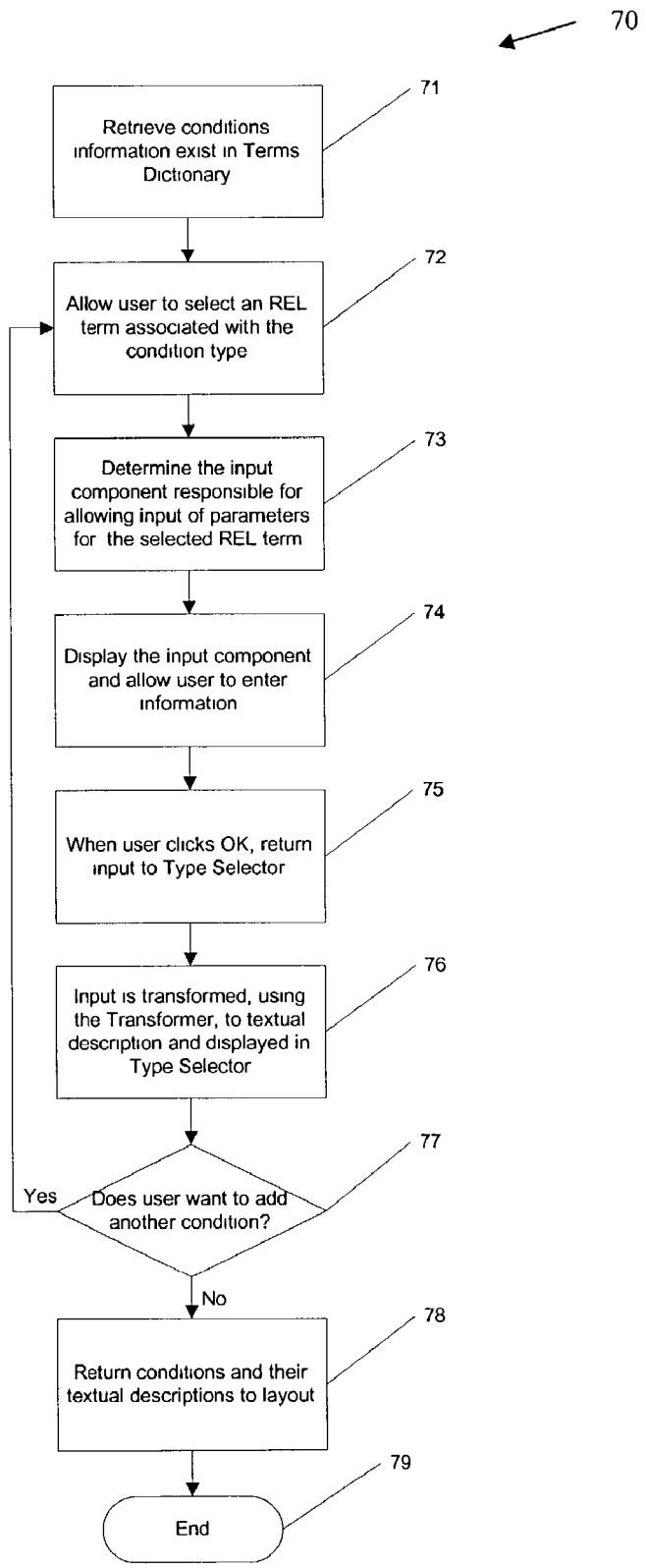
FIG. 9 is a flowchart of an example process for specifying conditions that are defined in the rights expression language and its extensions using a type selector.

FIG. 9 shows a flowchart 70 of an example process for specifying conditions that are defined in the REL and/or its extensions using a type selection component such as the type selector described above. Again, the extensions may be provided in the rights expression system 1 or be added thereto using the schema service for extension 22 as described above relative to FIG. 2. Initially, from a selected layout which corresponds to the desired rights granting paradigm, the user of the rights expression system 1 chooses to specify one or more conditions. The selected layout invokes the condition type selector and the method embodied in the flowchart 70 of FIG. 9 starts.

In step 71, the type selector queries the terms dictionary 16 for all available condition types, and presents the REL terms associated with the condition type. The user is allowed to select an REL term associated with the condition type in step 72. Based on the selected REL term, the associated input components such as an input form that allows inputting of the required parameters of the selected REL term is determined in step 73. The input components are displayed to the user in step 74 to allow inputting of parameters for the selected REL term. Preferably, the input forms are implemented in a GUI so that a visual mechanism is provided to help gather information for the particular REL term. The input forms indicate the types of information that are required or optional for a given REL term, or may perform other functions such as listing available options, validating user's input and building rights expressions based on input.

Upon completion of inputting the required parameters, the user indicates completion, for example, by clicking OK in step 75, and the inputted parameters are returned to the type selector where it is transformed to textual description for display in step 76. The user may choose to add another condition in step 77 which begins the procedure from step 72. When the user is finished with specifying conditions, the type selector returns both input data and their textual descriptions to the layout in step 78 for display in the layout. It is through this invocation and use of a type selector that rights expressions, including extended rights expressions, are converted from textual descriptions to rights expressions having proper REL semantics defined by the schemas of the REL, and back to text. Of course, it should be appreciated that whereas the above flowchart 70 of FIG. 9 was directed to the selection of conditions by a user, it should be readily apparent that similar procedures may be used to allow selection of other parameters of a given selected layout.

Figure 10:
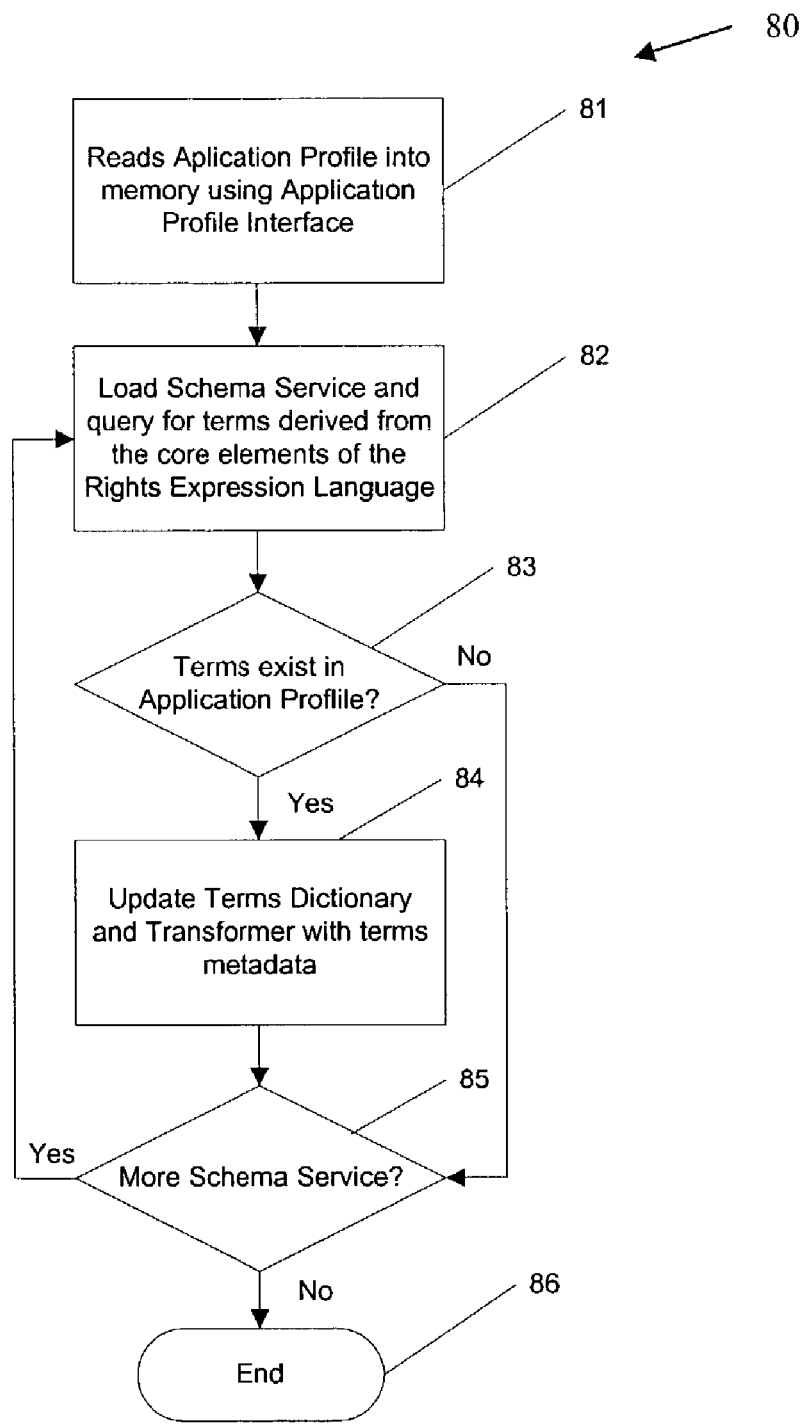
FIG. 10 is a flowchart of an example process for creating a terms dictionary and a transformer based on the Rights Expression Language, the extensions, and application profile.

FIG. 10 is a flowchart 80 setting forth the process for creating the terms dictionary 16 and the transformer 17 of FIG. 2. While being loaded, the data engine 5 instantiates the schema manager 18, which in turn, executes the procedure of the flowchart 80 of FIG. 10. In step 81, the application profile interface 20 is invoked to detect the existence of the application profile 19, and reads it into memory of the application profile interface 20. The schema manager 18 then searches the directory for schema services, schema service for REL 21 and schema service for extension 22. As previously noted, each of the schema services 21 and 22 provide information for the REL or one of its extensions. In step 82, each schema service 21 and 22 is queried for terms derived from the core elements of the REL. In the rights expression system 1 of the present embodiment, any derivations of the following core types are accounted for: principal, resource, condition, right and issuer. Of course, in other embodiments, other core types may be accounted for as well.

These REL terms are then filtered using the application profile in the memory of the application profile interface 20 in step 83. Only matched REL terms are inserted into the terms dictionary 16, and their metadata are stored in the transformer 17 in step 84. A determination is made in step 85 as to whether there are more schema services left. When all schema services have been processed, this procedure is ended in step 86.

Figure 11:
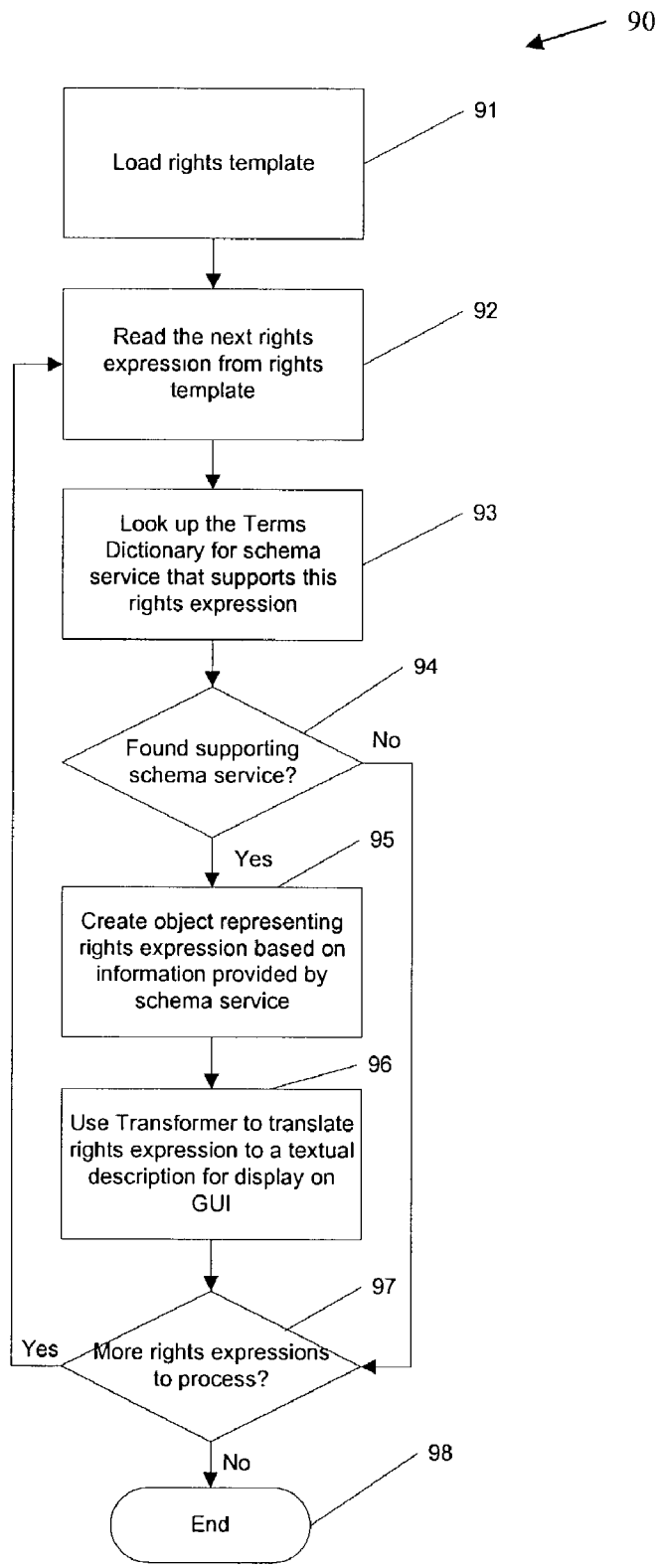
FIG. 11 is a flowchart of an example process for parsing a rights template and transforming its content to a textual description for display on the GUI.

FIG. 11 is a flowchart 90 for using the terms dictionary 16 and the transformer 17 in the rights expression system 1 of FIG. 2. When the user attempts to view a rights template, for instance, to modify the template to generate another rights expression, the rights template editor 12 makes calls to the data engine 5 to read the selected rights template and to create textual descriptions of the rights expressions suitable for display to the user in the manner described below. In step 91, the selected rights template is read into memory of the rights template editor 12, and in step 92, each of the enclosed rights expressions of the rights template are read. In step 93, an attempt is made to find the schema service that supports this rights expression using the terms dictionary 16 that may be built in the manner described above relative to FIG. 10.

In step 94, a determination is made as to whether the supporting schema service is found, and the nature of the rights expression is determined, including what core type it is and what its supporting schema service is. If no supporting schema service is found, a determination is made as to whether more rights expressions exist to process in step 97. If more rights expressions need to be processed, the process reverts to step 92 to iteratively process the rights expressions until no more rights expressions need to be processed so the process ends in step 98.

If a supporting service is found in step 94, an object representing the rights expression is created based on information provided by the schema services in step 95 to facilitate modification of the rights expression in the rights template. The transformer 17 is then invoked to translate the rights expression to a textual description for display on the rights template editor in step 96. Then, a determination is made as to whether more rights expressions exist to process in step 97. If more rights expressions need to be processed, the process reverts to step 92 to iteratively process the rights expressions until no more rights expressions need to be processed and the procedure ends in step 98. After the last rights expression has been processed, the content of the rights template is displayed on the rights template editor 12 so that the user can start editing the rights template to generate a new rights expression.

In accordance with another embodiment of the present invention, the rights expression system 1 may be provided with layouts 2 containing tokens, which are placeholders for information to be filled in later. These tokens may be employed by the rights expression system 1 of the present invention to increase the system usability and user-friendliness. In particular, a tokenized layout promotes reusability of frequently used rights expressions by producing a rights template with tokens that can be filled with information later, or a tokenized template may even be embedded within another rights template. Tokens are coded using XML Schema, for example, to represent a core element of the REL and to express their intent, thereby allowing selection of the appropriate information for replacement of the tokens.

For example, a promotion layout may be used to create an offer of free preview of some demo item to any buying customer. The rights expression for this promotion may contain a token representing a buying customer, and the information regarding the buying customer may be made available in a separate license. Later, when the user decides to offer this promotion along with some other item for purchase, the embedded token will be replaced using the customer specification for the second item. This allows the tokenized promotion offer to be reused by multiple rights templates targeting different customers. A token may be replaced with a pattern expression that matches a set of values, not just a single value. In another example, a certificate or the like which incorporates the generated rights expression may be intended for issuance to many individuals instead of just one person. In such an instance, a pattern may be provided which replaces the token, the pattern indicating the group of individuals to which the certificate is to be issued. For example, the certificate layout 33 of FIG. 4 provides a pattern indicating issuance of the certificate to anyone from www.uscstudentgroup.com. Of course, there are plenty of other applications for the use of such tokenized templates.

Figure 12:
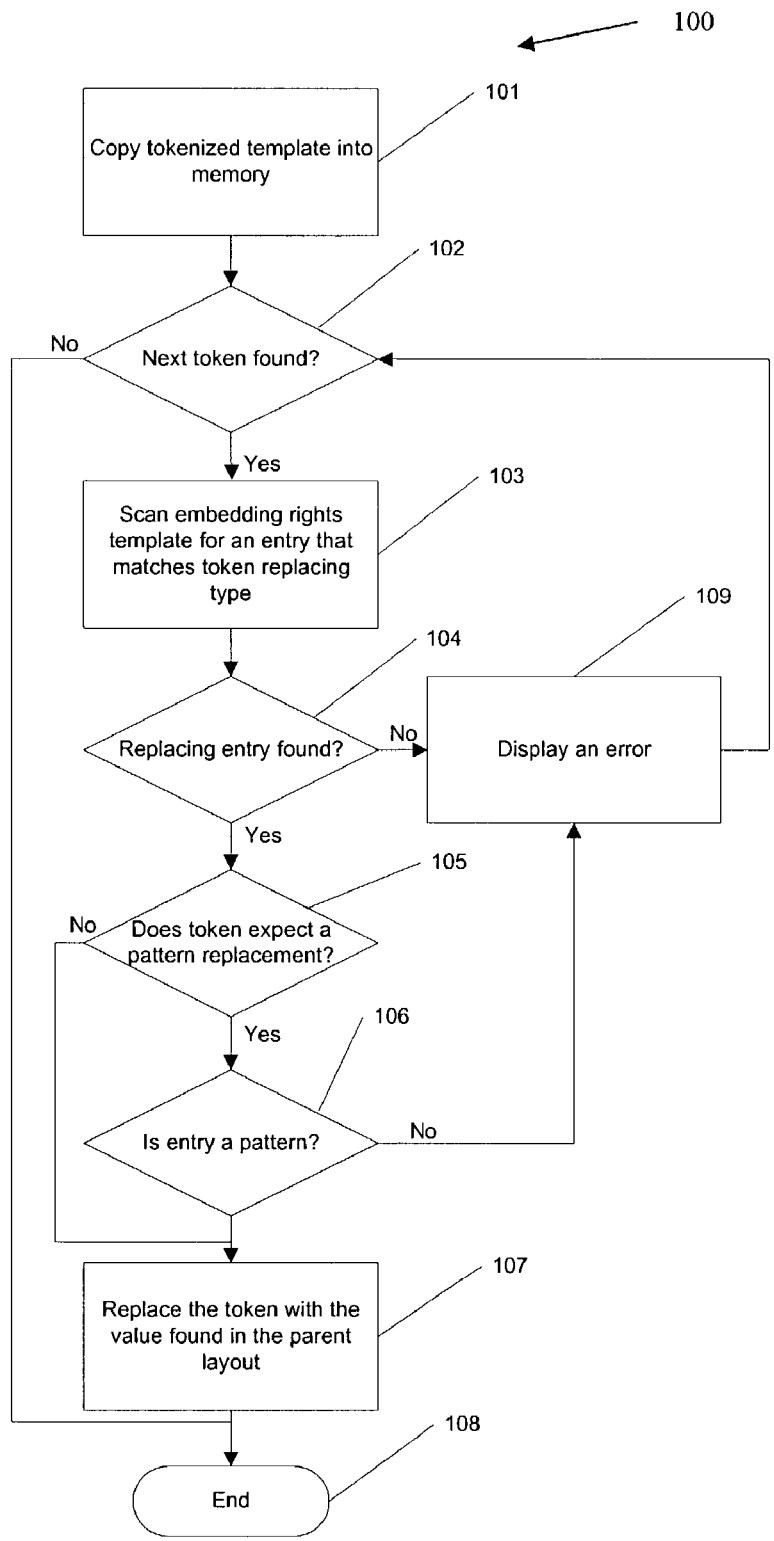
FIG. 12 is a flowchart of an example process for token replacement.

FIG. 12 shows a flowchart 100 that describes the token replacement process as a tokenized template is embedded within another rights template. In step 101, the tokenized template is copied into memory of the rights template editor 12 where replacement of tokens occurs. The search for a token begins in step 102. If no token is found in step 102, the process is ended in step 108. If a token is found in step 102, the embedding rights template is parsed to find an entry that matches the type described by the token in step 103. A determination is made in step 104 as to whether a matching replacing entry is found. If a matching replacing entry is not found, an error is displayed in step 109 and the process resumes to step 102 to process the next token.

If a matching replacing entry is found in step 104, the token is queried for its expectation of a pattern replacement in step 105. If a pattern is not required, the token is replaced with the value found in the parent layout in step 107 and the process is repeated starting in step 102 for the next token. If a pattern is required, a determination is made as to whether the entry is a pattern in step 106. If the entry is not a pattern, an error is displayed in step 109 and the process resumes to step 102 to process the next token. If the entry is a pattern, the token is replaced with the value found in the parent layout in step 107. The process is repeated starting in step 102 for the next token. When there is no more tokens to process, the process is ended in step 108. Optionally, step 109 may be enhanced to attempt an error recovery, for instance, converting the entry to match the token requirements, instead of just skipping to the next token. Moreover, in yet another enhancement may be made so that the tokens can represent elements other than core elements.

In view of the above, it should now be evident that the present invention provides a rights expression system and method having features and capability beyond generic editors. In particular, the present invention provides a rights expression system and method that provides guidance on the semantics of an REL and its extensions to allow the item owner, or the rights holder, to create and modify licenses more easily and accurately. As described, present invention greatly facilitates creation and/or modification of rights expressions in an REL that is based on one or more schemas.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications as defined by the appended claims and legal equivalents.

We claim:

1. A rights expression system for facilitating creation and/or modification of rights expressions in a rights expression language (REL) based on one or more schemas, said rights expression system comprising:
   one or more layouts selectable by a user of said rights expression system, each layout corresponding to a rights granting paradigm, each layout comprising:
      one or more type selectors selectable by the user, each type selector being adapted to present one or more REL terms associated with a selected type selector; and
      one or more input forms associated with said one or more REL terms which are invoked based on a REL term selected by the user, said one or more input forms allowing input of a parameter required by said selected REL term;
   a data engine that generates rights expressions in proper REL semantics defined by said one or more schemas based on said selected layout and parameter inputted by the user, and generates a rights template based on said generated rights expressions; and
   a database for storing and retrieving said generated rights template to allow modification of said parameter inputted by the user,
   wherein said data engine generates a plurality of rights templates based on a plurality of generated rights expressions, and said database is adapted to execute queries to retrieve one or more of said plurality of generated rights templates.

2. The system of claim 1, further including a terms dictionary for storing said one or more REL terms.

3. The system of claim 1, wherein said data engine includes a schema manager adapted to at least one of allow addition of new rights expressions, and allow modification of existing rights expressions based on an extension schema that modifies a parent schema of said REL.

4. The system of claim 1, further including a transformer to convert said generated rights expressions into a textual description for display.

5. The system of claim 1, wherein said one or more type selectors includes at least one of right type, resource type, condition type, principal type, and issuer type.

6. The system of claim 5, wherein said one or more type selectors includes a right type that presents REL terms for identifying usage rights that can be granted.

7. The system of claim 6, wherein said usage rights includes rights to at least one of view, edit, save, print, distribute, and transfer.

8. The system of claim 5, wherein said one or more type selectors includes a condition type that presents REL terms for setting conditions that can be associated with a usage right.

9. The system of claim 8, wherein said conditions is at least one of a fee, validity interval, and territory limitations on usage fights.

10. The system of claim 5, wherein said one or more type selectors includes a resource type that presents REL terms for identifying an item for which a usage right is to be granted.

11. The system of claim 10, wherein said item is at least one of digital content, digital document, eBook, digital multimedia, digital music, and digital video.

12. The system of claim 5, wherein said one or more type selectors includes a principal type that presents REL terms for indicating identity to whom a usage right is to be granted.

13. The system of claim 5, wherein said one or more type selectors includes an issuer type that presents REL terms for indicating identity of who grants a usage right.

14. The system of claim 1, further comprising a layout manager adapted to allow addition of new layouts into said rights expression system, said new layout corresponding to a new rights granting paradigm.

15. The system of claim 1, wherein at least one of said one or more layouts contain tokens that serve as placeholders for information to be provided.

16. The system of claim 1, wherein said one or more layouts are a plurality of layouts, each layout comprising a plurality of type selectors and plurality of input forms.

17. The system of claim 1, wherein said rights expression system is implemented with a graphical user interface (GUI) in a manner that said one or more layouts are displayed graphically.

18. The system of claim 1, wherein said rights expression system is implemented with a programmable interface.

19. The system of claim 1, wherein said rights expression system is implemented with a command line interface.

20. A method for creating and/or modifying rights expressions in a rights expression language (REL) based on one or more schemas comprising the steps of:
providing one or more layouts, each layout corresponding to a rights granting paradigm;
selecting at least one of said one or more of layouts;
providing one or more type selectors associated with said selected layout;
selecting at least one of said one or more of type selectors;
providing one or more REL terms associated with said selected type selector;
selecting at least one of said one or more of REL terms;
providing at least one input form associated with said selected REL term;
inputting a parameter required by said input form;
generating a rights expression in proper REL semantics defined by said one or more schema based on said selected layout and parameter inputted;
generating a rights template based on said generated rights expression;
storing said generated rights template;
retrieving said stored generated rights template; and modifying said parameter inputted.

21. The method of claim 20, further including the step of adding new rights expressions based on an extension schema that modifies a parent schema of said REL.

22. The method of claim 20, further including the step of converting said generated rights expressions into a textual description for display.

23. The method of claim 20, wherein said one or more of type selectors includes at least one of right type, resource type, condition type, principal type, and issuer type.

24. The method of claim 20, further including the step of providing tokens in at least one of said one or more of layouts, said tokens serving as placeholders for information to be provided.

25. The method of claim 20, wherein said one or more layouts are a plurality of layouts, each layout comprising a plurality of type selectors and plurality of input forms.

26. The method of claim 20, further including the step of displaying said one or more layouts graphically in a graphical user interface (GUI).

27. A rights expression system for facilitating creation and/or modification of rights expressions in a rights expression language (REL) based on one or more schemas, said rights expression system comprising:
one or more selectable layouts, each layout corresponding to a rights granting paradigm, each layout comprising:
one or more type selection components, each type selection component being adapted to present one or more REL terms; and
one or more input components associated with said one or more REL terms which are invoked based on a selected REL term, said one or more input components allowing input of a parameter required by said selected REL term;
a data engine that generates rights expressions in proper REL semantics defined by said one or more schemas based on said selected layout and parameter inputted; and generates a rights template based on said 2 generated rights expressions; and
a database for storing and retrieving said generated rights template to allow modification of said parameter inputted.

28. The system of claim 27, further including a terms dictionary for storing said one or more REL terms.

29. The system of claim 27, wherein said data engine includes a schema manager adapted to allow addition of new rights expressions based on an extension schema that modifies a parent schema of said REL.

30. The system of claim 27, wherein said one or more type selection components includes at least one of right type, resource type, condition type, principal type, and issuer type.

31. The system of claim 27, further comprising a layout manager adapted to allow addition of new layouts into said rights expression system, said new layout corresponding to a new rights granting paradigm.

32. The system of claim 27, wherein at least one of said one or more layouts contain tokens that serve as placeholders for information to be provided.

33. The system of claim 27, wherein said one or more layouts are a plurality of layouts, each layout comprising a plurality of type selection components and plurality of input components.

34. The system of claim 27, wherein said rights expression system is implemented with a graphical user interface (GUI) in a manner that said one or more layouts are displayed graphically.

35. The system of claim 27, wherein said rights expression system is implemented with a programmable interface.

36. The system of claim 27, wherein said rights expression system is implemented with a command line interface.

37. A method for creating and/or modifying rights expressions in a rights expression language (REL) based on one or more schemas comprising the steps of:
providing one or more layouts, each layout corresponding to a rights granting paradigm;
selecting at least one of said one or more of layouts;
providing one or more type selection components associated with said selected layout;
selecting at least one of said one or more type selection components;
providing one or more REL terms associated with said selected type selection components;
selecting at least one of said one or more of REL terms;
providing at least one input component associated with said selected REL term;
inputting parameters required by said input component;
generating a rights expression in proper REL semantics defined by said one or more schemas based on said selected layout and parameters inputted;

generating a rights template based on said generated rights expression;

storing said generated rights template;

retrieving said stored generated rights template; and modifying said parameters inputted.

38. The method of claim 37, further including the step of at least one of adding new rights expressions, and modifying existing rights expressions based on an extension schema that modifies a parent schema of said REL.

39. The method of claim 37, wherein said one or more of type selection components includes at least one of right type, resource type, condition type, principal type, and issuer type.

40. The method of claim 37 further including the step of providing tokens in at least one of said one or more of layouts, said tokens serving as placeholders for information to be provided.

41. The method of claim 37, wherein said one or more layouts are a plurality of layouts, each layout comprising a plurality of type selection components and plurality of input components.

42. The method of claim 37, further including the step of displaying said one or more layouts graphically in a graphical user interface (GUI).

* * * * *

UNITED STATES PATENT AND TRADEMARK OFFICE
CERTIFICATE OF CORRECTION

| | | |
|---|---|---|
| PATENT NO. | : 7,177,843 B2 | Page 1 of 1 |
| APPLICATION NO. | : 10/298222 | |
| DATED | : February 13, 2007 | |
| INVENTOR(S) | : Mai Nguyen, Joseph Zhung Yee Fung and Duc Tran | |

It is certified that error appears in the above-identified patent and that said Letters Patent is hereby corrected as shown below:

In claim 27, please delete the "2" in Col. 18, line 14.

Signed and Sealed this

Twenty-ninth Day of April, 2008

JON W. DUDAS
*Director of the United States Patent and Trademark Office*